Figure 1:
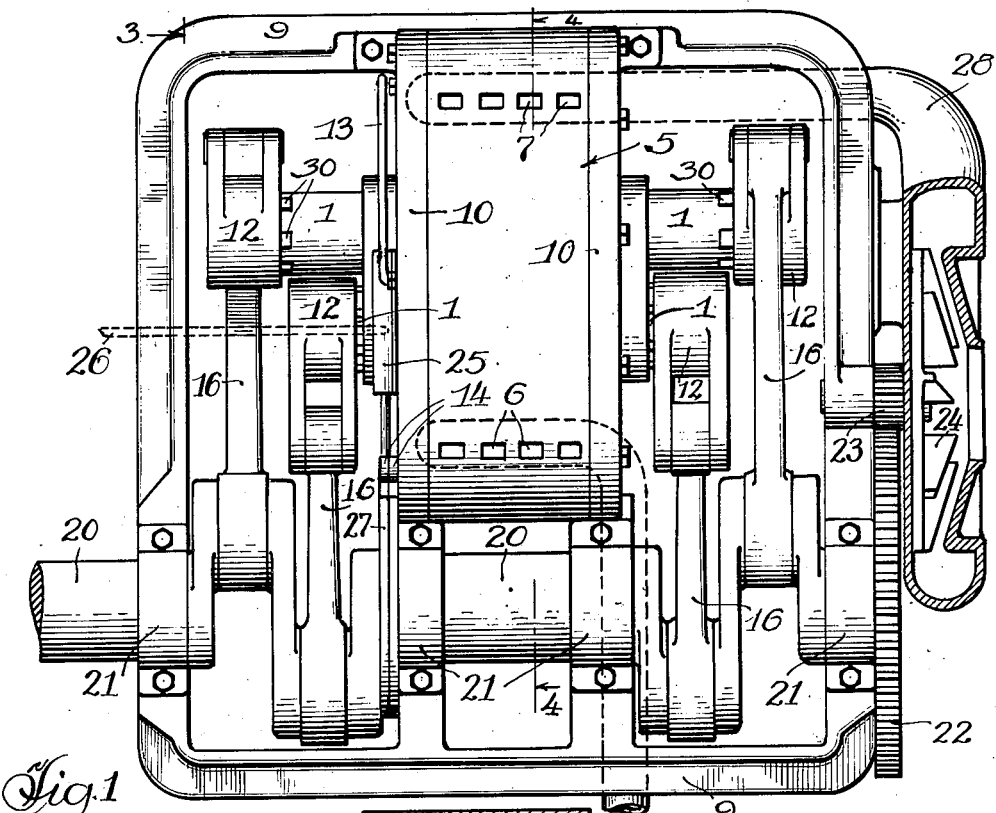

Oct. 7, 1941.   P. D. MIZE   2,257,884
ANGULAR DISPLACEMENT ENGINE OR COMPRESSOR
Filed Oct. 12, 1938   3 Sheets-Sheet 1

INVENTOR.
Paul D. Mize.

Oct. 7, 1941. P. D. MIZE 2,257,884
ANGULAR DISPLACEMENT ENGINE OR COMPRESSOR
Filed Oct. 12, 1938 3 Sheets-Sheet 2
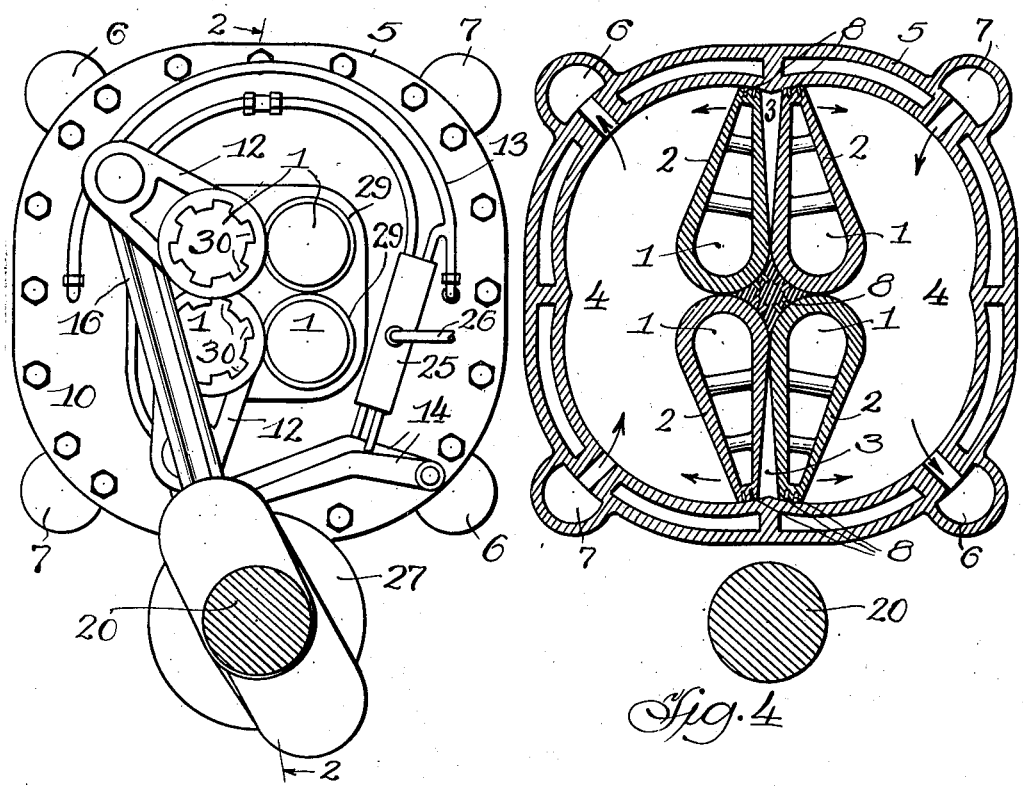
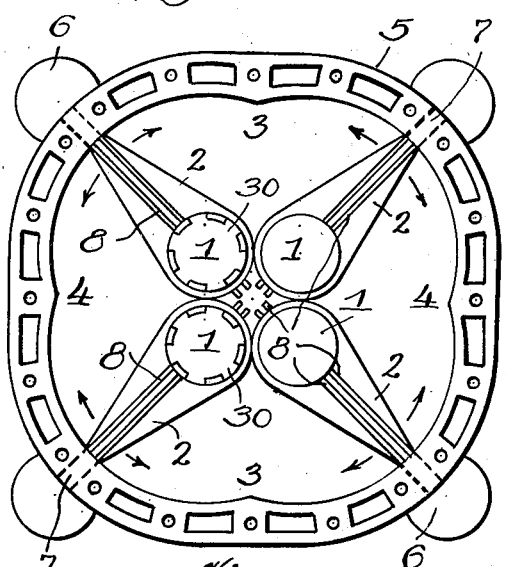
Fig. 3
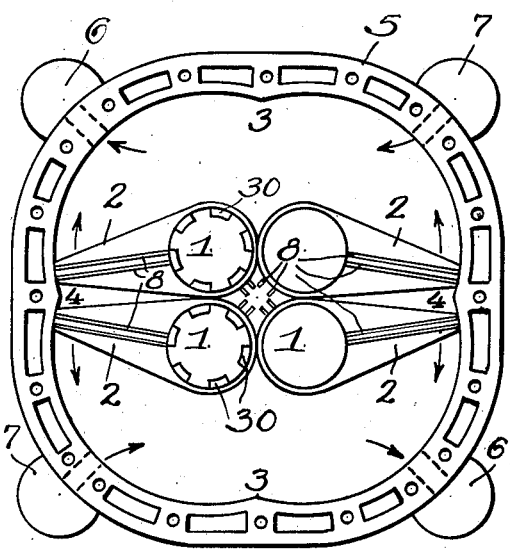
Fig. 4
Fig. 5 Fig. 6
INVENTOR.
Paul D. Mize.

Oct. 7, 1941.  P. D. MIZE  2,257,884
ANGULAR DISPLACEMENT ENGINE OR COMPRESSOR
Filed Oct. 12, 1938  3 Sheets-Sheet 3
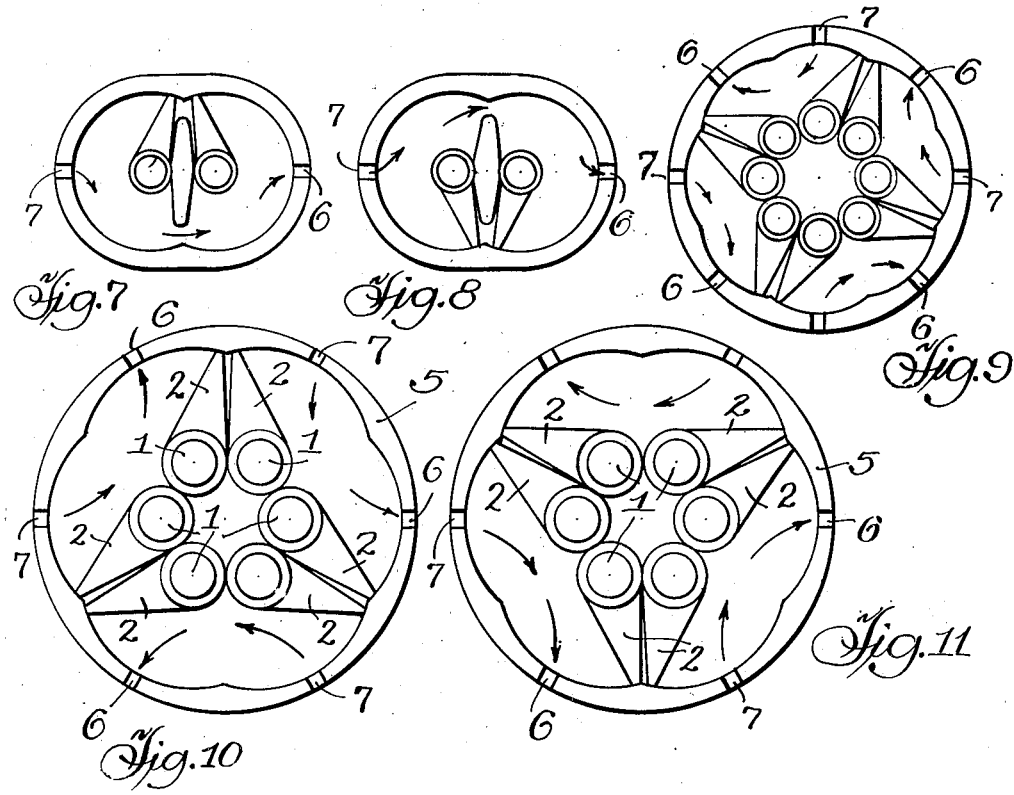
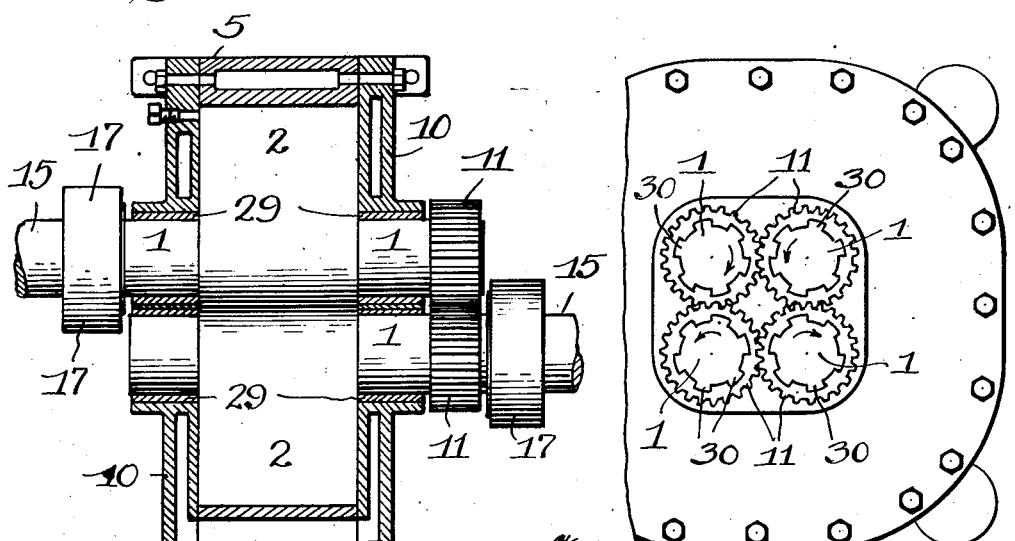
INVENTOR.
Paul D. Mize.

Patented Oct. 7, 1941

2,257,884

UNITED STATES PATENT OFFICE 2,257,884

ANGULAR DISPLACEMENT ENGINE OR COMPRESSOR

Paul D. Mize, Chicago, Ill.

Application October 12, 1938, Serial No. 234,659

2 Claims. (Cl. 123—18)

This invention relates to displacement devices such as pumps, compressors, motors and engines and more particularly to that type of such devices having a number of blades, acting as pistons in arcuate working chambers, adapted for restricted oscillation about their respective axes.

An object of this invention is to provide a mechanism including a number of piston blades adapted for restricted oscillation about their respective axes within a housing, which is adaptable for use as a pump, compressor, motor or engine of the displacement type, which is inherently balanced and which has great capacity with regard to its weight.

Another object is to provide in a device of the above character a novel construction and arrangement of parts whereby an exceedingly efficient and compact structure is realized, light in weight, simple in construction and easy to manufacture.

Still another object is to provide a device having the above mentioned features which is double acting, that is, work is performed by both sides of each said blade, and which has an opposed action, that is, work is performed between adjacent blades.

A further object is to provide in a device as described above adaptable for use as a two stroke cycle internal combustion engine a novel arrangement of parts including intake and exhaust ports whereby a very efficient scavenging action of the combustion chambers, thereof, is obtained.

Yet another object is to provide an engine of the above character whereby the area of the surfaces of the combustion chambers in contact with the motive fluid, is very small in relation to the cubic displacement, thereof, to provide an engine having good volumetric efficiency.

The above and other novel features of the invention will appear more fully hereinafter from the following detailed description, when taken in conjunction with the accompanying drawings. It is to be expressly understood, however, that the drawings are employed for purposes of illustration only, and are not designed as a definition of the limits of the invention, reference being had for this purpose to the appended claims.

Figure 2:
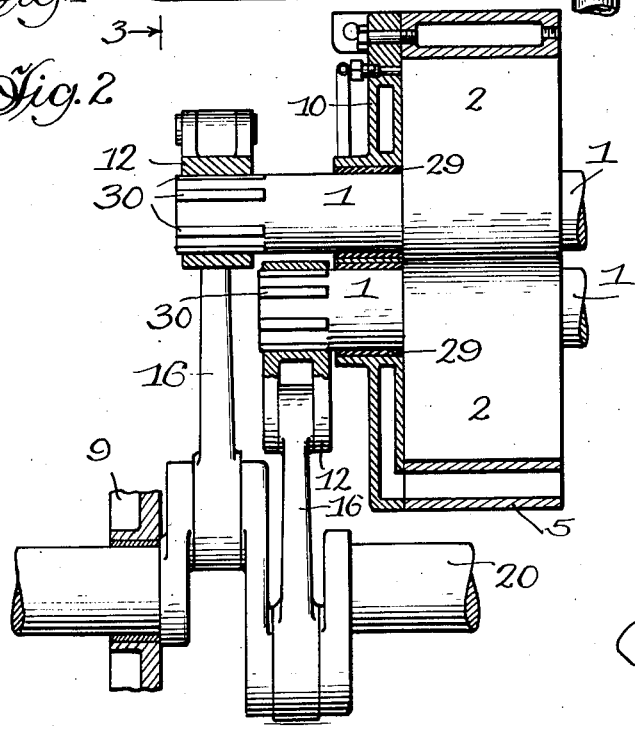

In the appended drawings similar reference characters refer to similar parts through the several views;

Figures 1 to 6 inclusive show the invention adapted for use as a two stroke cycle Diesel engine having a pump for injecting fuel, and a centrifugal fan for supplying air under pressure, to the combustion chambers thereof. Fig. 1 is a side elevation of the entire machine; Fig. 2, a view partly in section on line 2—2, Fig. 3; Fig. 3, an end view on line 3—3, Fig. 1; Fig. 4, a section on line 4—4, Fig. 1; Figs. 5 and 6, end views of the case with end plate removed; Figs. 7 to 11 inclusive, diagrammatic end views showing various blade arrangements; Fig. 12, a view partly in section, on line 2—2, Fig. 3, showing a different control means; and Fig. 13, an end view of Fig. 12.

Referring to Fig. 1 to 6 inclusive, case 5 and crankshaft 20 are supported by frame 9. Case 5 houses a blade assembly including four shafts 1, 1 journalled in bearings 29, 29 of end plates 10, 10, each shaft 1 having a blade 2 formed integral therewith, projecting radially from one side thereof. Blades 2, 2 are adapted for oscillation with shafts 1, 1 in bearings 29, 29 and cooperate with case 5 to define combustion chambers 3, 3 and 4, 4, therein. Bars 8, 8, functioning similarly to piston rings of the conventional engine, act as seals between said blades and case during said oscillation. Each shaft 1 has an arm 12 fixedly secured to one end thereof by means of splines 30, 30, and a connecting rod 16, cooperating with a crank-shaft 20 for imparting said oscillation to shafts 1, 1 during rotation of shaft 20. A gear 22 fixedly mounted on, and driven by crank 20, rotates gear 23 and centrifugal fan 24 providing air under pressure through duct 28 to intake ports 7, 7 of case 5. Duct 26 supplies fuel to pump 25 for distribution and injection into combustion chambers 3, 3 and 4, 4. This pump is actuated by cam 27 cooperating with cam followers 14, 14.

Figs. 4, 5 and 6, respectively, show the four blades 2, 2 in three of the different positions they assume while oscillating as above. Figs. 4 and 6 respectively, show their positions at the two ends of their working stroke, and Fig. 5, their positions midway of said stroke. For the purpose of simplification, the positions of blades 2, 2 as shown in Figs. 4, 5 and 6, will be referred to hereinafter as position 4, 5 and 6, respectively.

One complete working cycle of the engine comprises a series of cooperative movements of the parts thereof, including the rotation of blades 2, 2 from position 5 to position 6, reverse rotation to position 4, and another reverse rotation back to the starting position 5. During said rotation of blades from position 5 to position 6, air under pressure enters at intake ports 7, 7 causing the gases in chambers 3, 3 to exhaust through exhaust ports 6, 6. Also, during the stroke from position 5 to position 6 the air in chambers 4, 4 is compressed and fuel is injected into said compressed air. About the time the blades reach position 6 combustion occurs in chambers 4, 4 and the blades rotate back to position 5 permitting expansion of the gases in chambers 4, 4 and ending the scavenging of chambers 3, 3 by closing intake ports 7, 7 and exhaust ports 6, 6, said scavenging having continued while blades were rotating from position 5 to position 6 and back again to position 5. Said blades continue on from position 5 to position 4, compressing the air in chambers 3, 3, and opening the intake and exhaust ports to chambers 4, 4, thus permitting the scavenging thereof, by the entrance of air through the intake ports 7, 7 and the exhaust of the combustion gases through exhaust ports 6, 6. Also, during rotation of blades from position 5 to position 4, fuel is injected into chambers 3, 3, and combustion occurs therein about the time that the blades reach position 4. The blades then rotate back from position 4 to position 5, permitting the expansion of the gases in chambers 3, 3, and ending the scavenging of chambers 4, 4 by closing intake ports 7, 7 and exhaust ports 6, 6, said scavenging having continued during the time that the blades were rotating from position 5 to position 4 and back again to position 5; thus completing the cycle.

It is apparent, therefore, that during one said cycle each intake port 7 cooperates with first one and then the other exhaust port 6, admitting air for scavenging first a chamber 3 and then a chamber 4, and that each exhaust port 6 cooperates alternately with the two intake ports 7, 7, exhausting gases displaced first by air admitted by one intake port 7 and then by the other; two intake ports and two exhaust ports scavenging and providing air to four combustion chambers.

Since the two chambers 3, 3 function coincidentally with regard to compression, combustion and expansion, and are on diametrically opposite sides of case 5, it is apparent that the forces tending to displace case 5 created by said functioning in one chamber 3 are counterbalanced by like forces created at the same time in the opposite chamber 3, and as chambers 4, 4 also function simultaneously the like forces created respectively therein counterbalance each other.

Also since blades 2, 2 are arranged symetrically about the axis of case 5 and oscillate simultaneously, adjacent blades oscillating in opposite directions, it is evident that the centrifugal and inertia forces incidental to the oscillation of said blades respectively counterbalance each other and do not tend to displace case 5.

If desired six, eight or any larger even number of blades may be used in the construction of a device of this kind instead of the four as described (see Figs. 9, 10 and 11), and still retain the inherent balance of the centrifugal, inertia and compression forces as previously described. Two blades may also be used, retaining the described cycle of operation but the centrifugal, inertia and compression forces will not be balanced as are the larger even numbers of blades, in said device.

In addition to the means shown and described previously, for imparting oscillation to said blades, there are other structures and arrangements of parts which may be employed for imparting the desired movements to said blade assembly and associated parts. Also various means may be employed for scavenging said combustion chambers including the use of the four stroke cycle instead of the two stroke cycle as shown and described.

And instead of employing means adapted to syncronize and limit the extent of the oscillations of said blades, such as the crank 20, connecting rods 16, 16, arms 12, 12 and associated parts, a means may be employed which synchronizes the movements of blades 2, 2, but does not impart movement thereto, or limit the extent of the oscillations thereof. When this structure is adapted for use as an internal combustion engine, the two stroke cycle of operation as previously described may be incorporated. Various means may be used for synchronizing the movements of blades 2, 2 including gears 11, 11, (see Figs. 12 and 13), which are fixedly secured to shafts 1, 1 by means of splines 30, 30, and cooperate together during the oscillation of said shafts, causing adjacent blades thereof, to rotate in opposite directions, approaching and receding from each other, in unison, but not limiting the extent of each oscillation or working stroke thereof. The compression of a motive fluid, such as air or the combination of air and some other substance, between said blades in said chambers as described, at each end of each oscillation, is used to limit the extent of said blade strokes. It is apparent, therefore, that the faster said oscillations take place, in a given structure, the greater will be the pressures obtained between said blades in said chambers.

There are various methods which may be employed for using the energy produced by this type of engine, such as the employment of one or more clutches 17, 17, Fig. 12, which are adapted to transmit power in only one direction of rotation, such as the freewheeling device for automobiles, providing continuous rotation of one or more driveshafts 15, 15, or said energy may be used in a device employing the principles of this invention; the blades in last said device and the blades in the prime mover oscillating in unison.

Other changes in the construction and arrangements of parts may be made without departing from the spirit of the invention, as will be apparent to those skilled in the art. Reference will therefore be had to the appended claims for a definition of the limits of the invention.

I claim:

1. A device of the character described, adapted for use as a prime mover, said device embodying an annular casing having four inner surfaces of arcuate shape, a port for each said surface disposed centrally thereof, each said surface inscribed upon a separate radius, and the said radii arranged around and eccentric to the axis of said casing; four piston blade units each comprising a shaft and a piston blade extending radially from one side thereof, said shafts journaled in said casing and adapted for prescribed synchronous oscillatory movement upon axes coincident to the respective radii of said arcuate surfaces, and said blades disposed with their free edges in coactive relation with the respective arcuate surfaces; a portion centrally disposed with regard to said casing and in coactive relation with the four said shafts, said portion, units and casing defining working chambers; means for oscillating said units through their prescribed arcs in a manner such that adjacent said units rotate in opposite directions, each said blade passing its respective port midway of said oscillation, said ports comprising two intake and two exhaust ports disposed alternately relative to said casing; and means for supplying motive fluid under pressure to said intake ports.

2. A device of the character described, adapted for use as a prime mover, said device embodying an annular casing having an even number of four or more inner surfaces of arcuate shape, a port or orifice for each said surface disposed centrally thereof, each said surface inscribed upon a separate radius, and the said radii arranged around and eccentric to the axis of said casing; a piston blade unit for each said surface comprising a shaft and a piston blade extending radially from one side thereof, said shafts journaled in said casing and adapted for prescribed synchronous oscillatory movement upon axes coincident to the respective radii of said arcuate surfaces, and said blades disposed with their free edges in coactive relation with the respective arcuate surfaces; a portion centrally disposed with regard to said casing and in coactive relation with said shafts; said portion, units and casing defining working chambers; means for oscillating said units through their prescribed arcs in a manner such that adjacent said units rotate in opposite directions, each said blade passing its respective port midway of said oscillation, said ports comprising intake and exhaust ports disposed alternately relative to said casing; and means for supplying motive fluid under pressure to said intake ports.

PAUL D. MIZE.